United States Patent
Talbot et al.

(10) Patent No.: US 9,260,254 B2
(45) Date of Patent: Feb. 16, 2016

(54) SAFETY CONVEYOR APPARATUS

(71) Applicants: Lateral Innovations Inc., St-Malachie (CA); Groupe Gaudreau, Victoriaville (CA)

(72) Inventors: Benoit Talbot, St-Malachie (CA); Real Fortin, Victoriaville (CA)

(73) Assignees: Lateral Innovations Inc., St. Malachie, QC; Groupe Gaudreau Inc., Victoriaville, QC ( * ) Notice: Subject to any disclaimer, the term of this patent is extended or adjusted under 35 U.S.C. 154(b) by 0 days.

(21) Appl. No.: 14/469,262

(22) Filed: Aug. 26, 2014

(65) Prior Publication Data
US 2015/0114802 A1    Apr. 30, 2015

Related U.S. Application Data

(60) Provisional application No. 61/897,918, filed on Oct. 31, 2013.

(51) Int. Cl.
| | |
|---|---|
| *G08B 21/02* | (2006.01) |
| *B65G 43/02* | (2006.01) |
| *B65G 43/00* | (2006.01) |

(52) U.S. Cl.
CPC .......... *B65G 43/00* (2013.01); *B65G 2203/046* (2013.01); *B65G 2207/40* (2013.01)

(58) Field of Classification Search
CPC .............................................. B65G 2811/0673
USPC .......... 198/502.1, 502.3, 810.01; 340/539.11, 340/539.22, 686.5, 686.6
See application file for complete search history.

(56) References Cited

U.S. PATENT DOCUMENTS

| | | | | |
|---|---|---|---|---|
| 7,128,270 B2* | 10/2006 | Silverbrook et al. | ..... | 235/472.01 |
| 7,474,938 B2* | 1/2009 | Poliner | ......................... | 700/242 |
| 7,648,020 B2* | 1/2010 | Dickover et al. | .............. | 198/600 |
| 8,079,916 B2* | 12/2011 | Henry | ........................... | 472/128 |
| 8,149,126 B2* | 4/2012 | Little et al. | ................. | 340/573.7 |
| 8,279,065 B2* | 10/2012 | Butler et al. | ................ | 340/572.1 |
| 8,564,452 B2* | 10/2013 | Schaible et al. | ........... | 340/686.6 |
| 8,751,035 B2* | 6/2014 | Janet | ............................. | 700/214 |
| 8,917,159 B2* | 12/2014 | McAllister et al. | ............. | 340/5.8 |

* cited by examiner

*Primary Examiner* — Douglas Hess
(74) *Attorney, Agent, or Firm* — Adrian D. Battison; Ade & Company Inc.

(57) ABSTRACT

A safety conveyor apparatus includes a feed section at which a worker loads the materials onto the conveyor and a subsequent conveyor section and an apparatus is provided for immobilizing the conveyor to ensure the safety of the worker in case the worker should be accidentally carried on the conveyor into the conveyor section. Each worker has a vest carrying a series of RFID tag members and a plurality of directionally shielded RFID antennas are mounted on the conveyor section on an arch above the conveyor facing downwardly and on sides facing inwardly to provide a signal to a control system responsive to detection of one or more of the tags by one or more of the antennas for stopping the movement of the conveyor. The tags are programmed with easily detectable codes which indicate the article to which they are attached allowing a periodic test procedure to be run.

15 Claims, 5 Drawing Sheets

RFID tags memory content

| Memory bank | Content | Size | Notes |
|---|---|---|---|
| TID | DEDh | 8 digits | safety article tag |
| EPC | Empty | 16 digits | |
| EPC | Article of clothing serial number | 4 digits | Each article of clothing will have a different number here |
| EPC | Quantity of tags on article of clothing | 2 digits | There can be up to 255 tags on an article of clothing (hex numbers) |
| EPC | Tag number | 2 digits | Each tag has a unique number |

FIG. 6

SAFETY CONVEYOR APPARATUS

This application claims the benefit under 35 USC 119 (e) of Provisional Application 61/897,918 filed Oct. 31 2013.

This invention relates to a safety conveyor apparatus where the conveyor includes antennas for detecting RFID tags carried on an article of clothing of the worker to stop the conveyor in the event that the worker is accidentally carried on the conveyor.

SUMMARY OF THE INVENTION

According to the invention there is provided a safety conveyor apparatus comprising:

a conveyor having a conveyor belt or belts for transporting materials to a required location, the conveyor defining a feed section at which a worker loads the materials onto the conveyor and a conveyor section;

and an apparatus for selectively immobilizing the conveyor to ensure the safety of the worker in case the worker should be accidentally carried on the conveyor into the conveyor section, the apparatus comprising:

an article of clothing wearable by the worker, the article of clothing having a plurality of RFID tags carried on the article of clothing;

a plurality of RFID antennas mounted on the conveyor at a position beyond the feed section;

and a control system responsive to detection of one or more of the tags by one or more of the antennas for stopping the movement of the conveyor.

Preferably there is provided a spacer between the tag and the clothing to ensure a reasonable reading distance even when the article of clothing is pressed against the worker's body.

Preferably the spacer is formed of closed cell foam or other material which provides generally a space which is mostly an air space and avoids collection of moisture against the tag.

Preferably the RFID antennas are oriented in such a way to reduce reflections that could falsely detect the tags when the worker is located at the feed section.

Preferably the antennas each include a radio frequencies shield to prevent emission of electromagnetic waves in a direction away from the material on the conveyor. The shields can be formed of a metal layer and can be combined with an electromagnetic field absorbing material such as wood to reduce the amount of radiation in the direction which is not required.

Preferably the antennas are arranged with at least one located above the conveyor at a position so that material on the conveyor passes underneath the antenna. In this arrangement preferably the antenna or two transversely spaced antennas are arranged with a front face thereof facing generally downwardly toward the conveyor which reduces stray radiation in the reverse direction so as to reduce false detections by reflections. in this arrangement preferably the front face lies in a plane generally parallel to the conveyor belt. The antennas can be carried on an additional arch or bar located above the conveyor. These two downwardly facing antennas can be supplemented by additional inwardly facing antennas located at the sides on upstanding side walls each on a respective side of the belt of the conveyor to ensure that a tag worn by a worker is detected even if covered with a layer of material on top of the fallen worker.

Preferably the tags are programmed with a predetermined pattern allowing the system to quickly and efficiently differentiate tags on the article of clothing from any other RFID tags that can be present on the conveyor.

Where the system includes a plurality of articles of clothing arranged to be worn by different workers and all tags of all the articles of the system are encoded at one level of encoding with the same simple easily detectable code.

In addition each tag can be encoded with a separate additional code unique to the tag and each article has the tags thereof is encoded with a separate additional code unique to the article.

Preferably for daily or shift commencement verification, a separate test unit of the control system can be used to verify the good working condition of each tags worn by the worker. The test unit is arranged to detect all of the tags of the article of the worker set to work at the conveyor to confirm that all are operating. In this arrangement each article has the tags thereof is encoded with a separate additional code unique to the article in order to confirm that all of the tags detected in the set up verification relate to the same article.

Thus each of the tags on the article of clothing is verified. If any tag from the sequence number is not read within a given delay based on the quantity of tags there are on the article of clothing, an error message is sent to the worker on a display monitor. The error message can be but is not limited to a red light and a sound alarm. If all tags are detected within the time delay, a test passed signal is sent to the worker. This test passed signal can be but is not limited to a green light.

Disclosed therefore is a method and apparatus for selectively immobilizing a conveyor to ensure the safety of a worker in case of a fall onto the conveyor acting to carry the worker out of the feed section. The apparatus comprises an article of clothing wearable by the proximate worker such as a safety vest carrying a plurality of RFID tag members, an RFID reader system having a plurality of RFID antennas and a control system which acts for stopping the conveyor in response to the sensing.

The article of clothing has a plurality of RFID tags that are attached to the clothing with a backing spacer in such a way that they can be read from a required distance. The RFID reader through the RFID antennas senses the proximity of the RFID tags to the conveyor.

The RFID tags are programmed following a unique pattern such that they are quickly recognized and differentiated from other RFID tags that could be attached to other objects deposited on the conveyor. This pattern also includes the article of clothing number and, the quantity of tags on the article and the tag number. A testing station as part of the control system can be provided to test that the RFID tag members of the article of clothing worn are active.

This testing station comprises a RFID reader, one or more RFID antennas and a computer which runs a program that compare RFID tags read with the known content pattern to verify that every tag is present on the article of clothing and are active.

The method comprises sensing the proximity of the RFID tags to a conveyor and stopping the movement of the conveyor in response to the sensing.

Two or more test RFID tags are also mounted on the detecting arch over the conveyor. These tags have a known serial number which is different from the numbers encoded in the clothing so that these tags are not detected as safety tags. The RFID reader frequently reads these tags (every second or so) to ensure each of its antennas are still functioning. If one RFID antenna of the system fails to report the presence of one or more of these test tags, the conveyor is stopped and the alarm is raised.

A computer can be added to the monitoring system to frequently monitor the operational state of the RFID reader to ensure it is functioning properly. The computer frequently sends a request (every second or so) to the RFID reader to get the RFID tags serial number, the date and time. If after a maximum delay (say 0.5 second) the computer has not received a response or has received an incorrect response, it stops the conveyor and raises the alarm.

The RFID reader also sends a request to the computer frequently (every second or so) to get the date and time. If after a maximum delay (say 0.5 seconds) the reader has not received a response or has received an incorrect response, it stops the conveyor and raises the alarm.

The support for the overhead RF antennas can be made of telescopic steel tubes that are inserted one into another to make them extendable so that the support can be adjusted in width and height to fit any conveyor width and any desired height.

The testing station displays on a monitor the vest number of the worker or workers present at the testing reader. In case more than one worker is present during the test procedure and only some of the vests passes the test at that time, the monitor can display the result for many vests at the same time. If therefore a worker sees that his vest number is not displayed, it means that his vest is not functional and must be replaced.

BRIEF DESCRIPTION OF THE DRAWINGS

One embodiment of the invention will now be described in conjunction with the accompanying drawings in which:

FIG. 6 is a table listing the encoding of each tag in the two different banks of encoding.

In the drawings like characters of reference indicate corresponding parts in the different figures.

DETAILED DESCRIPTION

Figure 1:
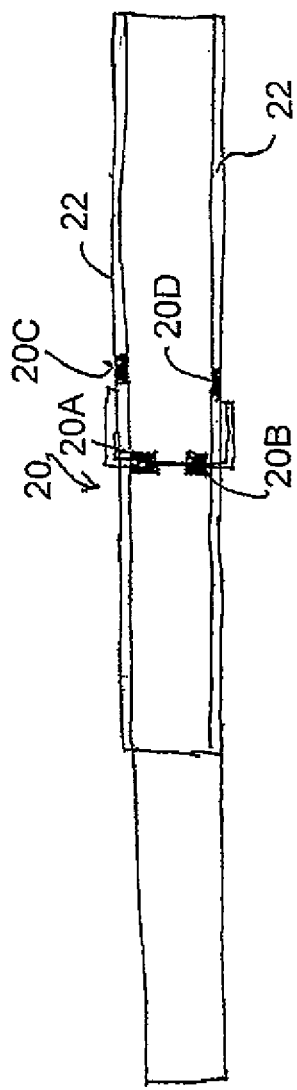
FIG. 1 is a top plan view of a conveyor with safety system according to the present invention.
Figure 2:
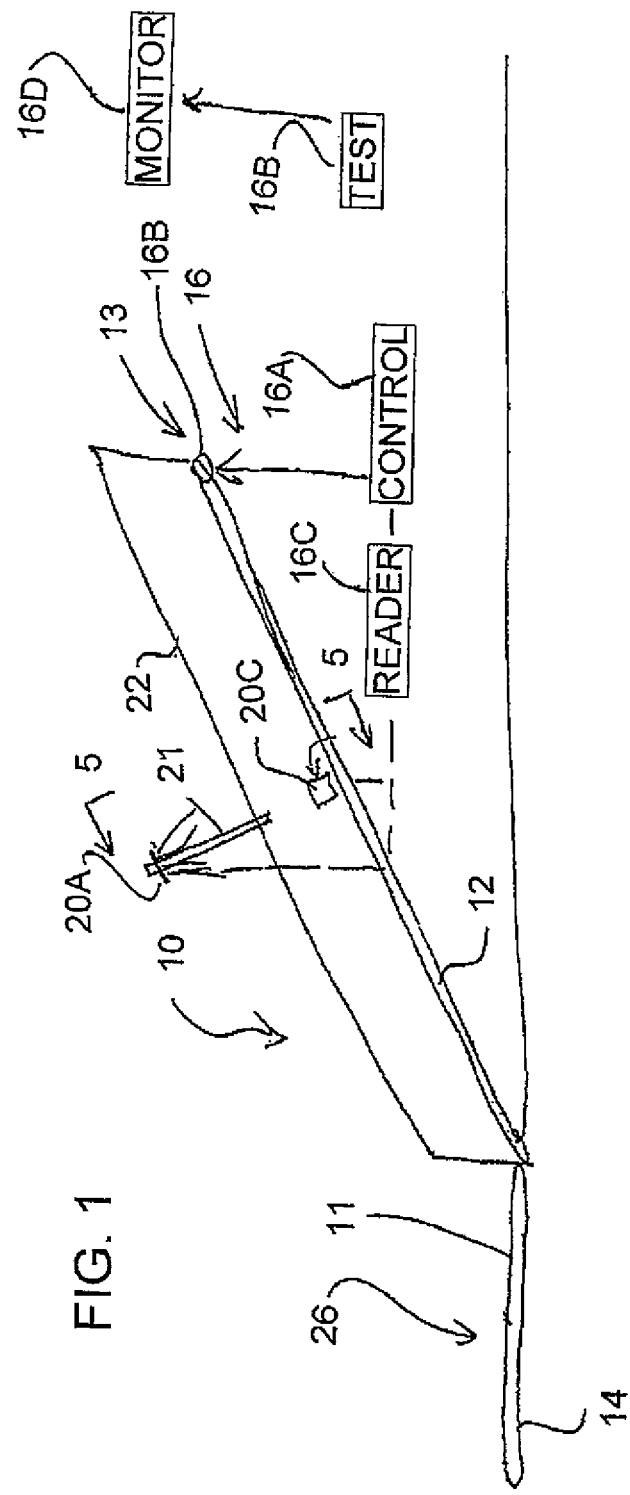
FIG. 2 is a side elevational view of a conveyor with safety system of FIG. 1.

The apparatus comprises a safety conveyor apparatus 10 having a conveyor belt or belts 11, 12 for transporting materials to a required location 13. The conveyor defines a horizontal feed section 14 at which a worker loads the materials onto the conveyor and an inclined conveyor section 15. The arrangement is particularly designed for use with garbage separation systems where the worker loads separated garbage such as cardboard onto the feed conveyor 14.

The risk is that the worker falls or is injured and lies on the conveyor and can be carried to the location 13 where serious injury can occur.

There is provided an apparatus 16 including a control unit 16A for selectively immobilizing the conveyor by halting a motor 16B to ensure the safety of the worker in case the worker should be accidentally carried on the conveyor into the conveyor section.

The apparatus includes an article of clothing 17 (FIG. 3) such as a vest wearable by the worker which carries a plurality of RFID tag members 17X, 17Y in an array on the article of clothing. There may be for example eight such tag members arranged on the front, sides, rear and shoulders of the vest so that no matter the orientation of the worker on the conveyor one of the sensors will detect the tag of the vest.

Figure 3:
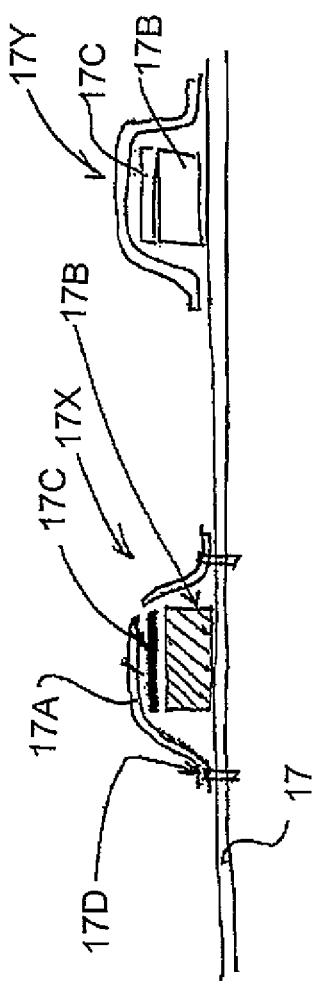
FIG. 3 is a cross-sectional view of one of the tags of the safety system according to the present invention.
Figure 4:
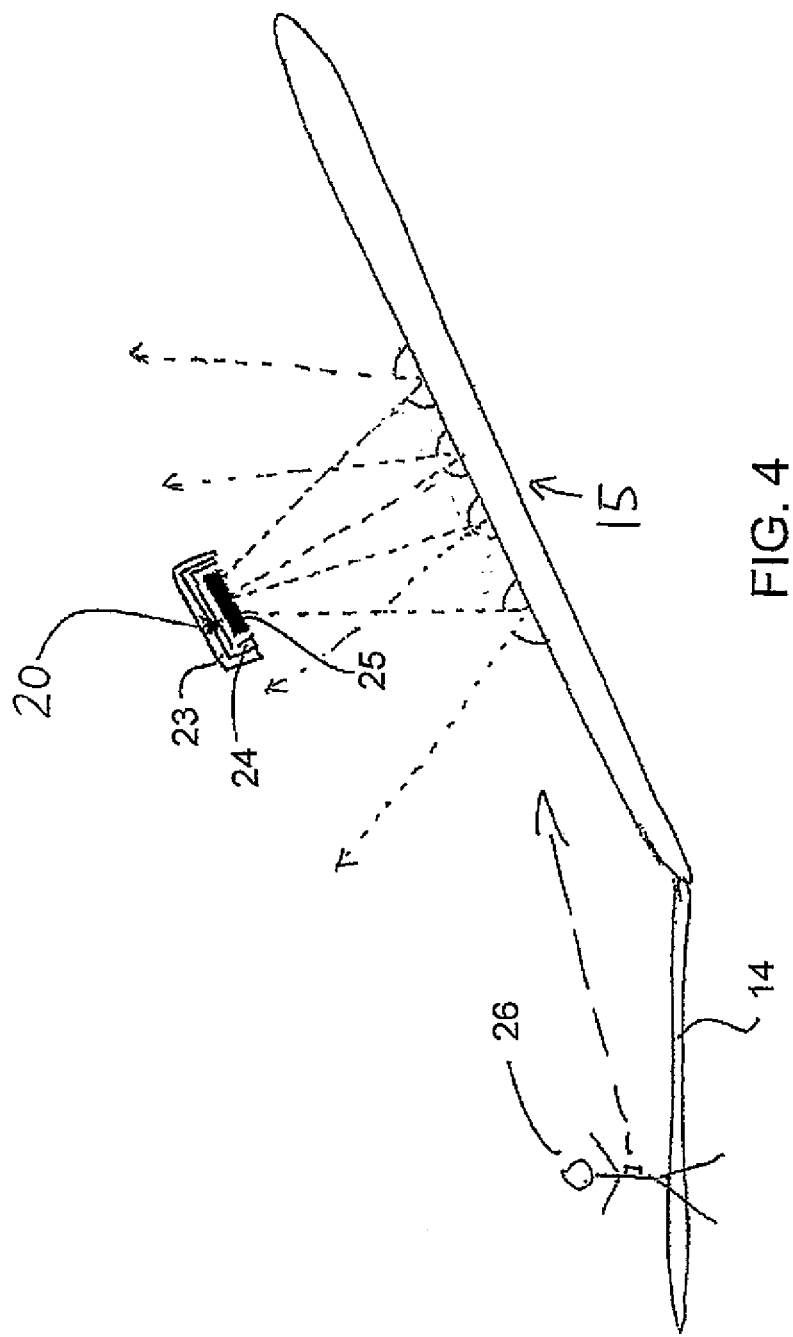
FIG. 4 is a side elevational view of the conveyor of FIG. 1 showing the reduction of reflections toward the worker in his normal working area which is obtained.

As shown in FIG. 3, each tag member is a waterproof tag body 17C held in place on the article by a fabric layer or patch 17A stitched at 17D to the article 17 and there is provided a closed cell foam spacer 17B between the tag body 17C and the clothing to ensure a reasonable reading distance or the tag by the antennas even when the article of clothing is pressed against the worker's body.

A plurality of RFID antennas 20 is mounted on the conveyor at a position beyond the feed section that is on the inclined section for detecting the presence of the worker on the conveyer even if covered with a layer of material.

There are two RFID antennas 20A and 20B on a cross bar or arch 21 attached to the side walls 22 which are oriented to direct the field downwardly in such a way to reduce reflections that could falsely detect the tags when the worker is located at the feed section.

Each of the antennas includes a radio frequencies metal shield 23 to prevent emission of electromagnetic waves in a direction away from the material on the conveyor and the shield is combined with an electromagnetic field absorbing material 24 on three sides of the antenna.

The antennas 20A and 20B are arranged with above the conveyor on the arch or bar 21 at a position so that material on the conveyor passes underneath the antenna.

The antenna is arranged with a front face 25 thereof facing generally downwardly toward the conveyor and in a plane generally parallel to the conveyor belt so that it faces the metal belt which can generate reflections as shown. As the worker in his operating position 26 at the feed section 14 is well away from the belt in the section 15, reflections from the belt which tend to go back up towards the ceiling do not pass in the generally horizontal direction to reach the tags on the vest of the worker.

As shown in Table 1, the tags are programmed in the user memory section with a predetermined pattern such as that indicated at "DEDh" which is a simple, immediately discernible pattern allowing the system to quickly and efficiently differentiate tags on the article of clothing from any other RFID tags that can be present on the conveyor.

As shown in Table 1, all tags of all the articles are encoded with the same simple easily detectable code.

As shown in Table 1, each tag is encoded with a separate additional code unique to the tag.

As shown in Table 1, each article has the tags thereof encoded with a separate additional code unique to the article.

The test unit 16B is arranged to detect all of the tags of the article in a set-up procedure to confirm that all are operating.

As shown in Table 1, each article has the tags thereof is encoded with a separate additional code unique to the article in order to confirm that all of the tags detected in the test procedure relate to the same article.

As shown in Table 1, each of the tags is thus programmed with the article of clothing sequence number, with preferably the quantity of tags there are on the article of clothing and the individual tag number.

Figure 5:
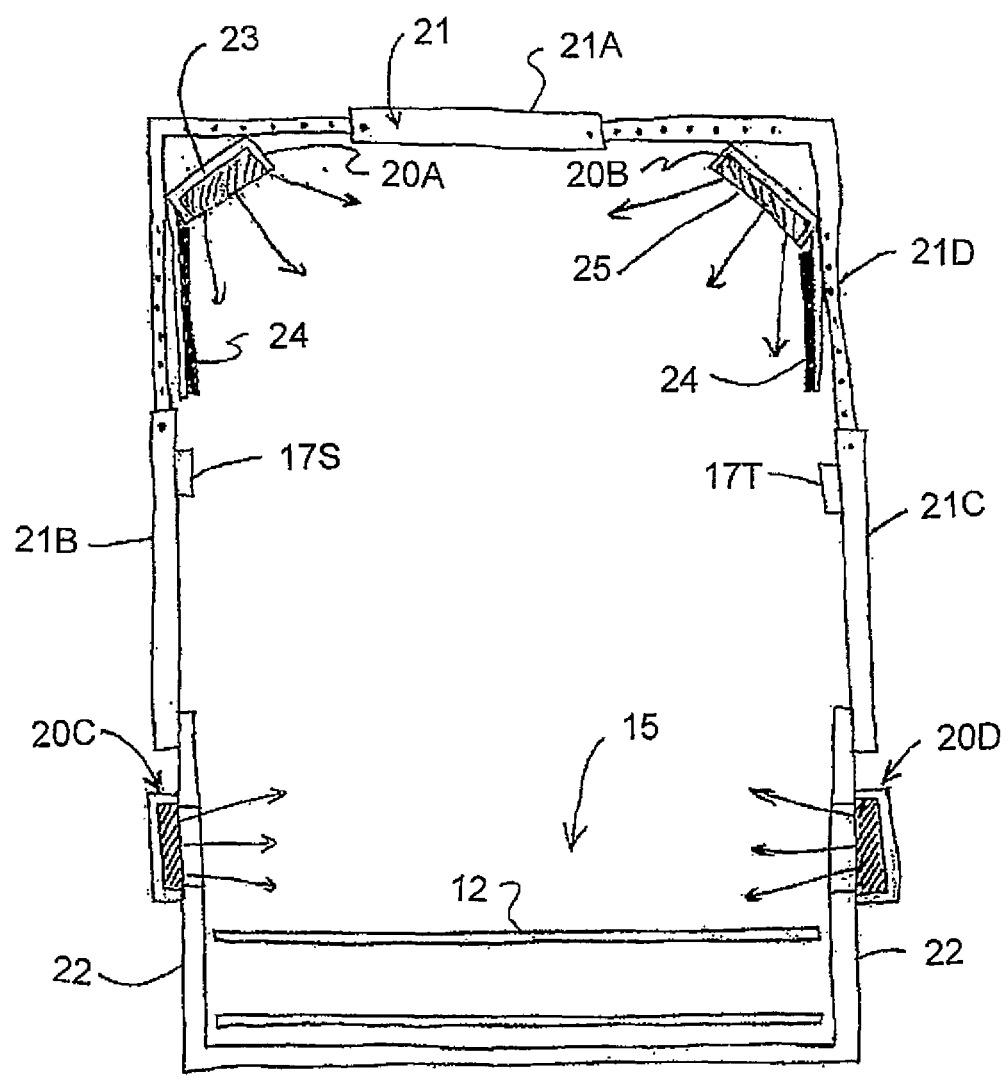
FIG. 5 is a cross-sectional view along the lines 5-5 of FIG. 2 showing the arch supporting the RF antennas.

As shown in FIG. 5, the support 21 for the overhead RF antennas 20A and 20B comprises a horizontal rail 21A and upstanding posts 21B, 21C defined by telescopic steel tubes that are inserted one into another to make them extendable so that the support can be adjusted in width and height by selection of adjustment holes 21D to fit any conveyor width and any desired height. The antennas are located diagonally at the corners between the rail 21A and the posts 21B, 21C so as to face downwardly of the rail and inwardly of the posts.

Two or more RFID tags 17S and 17T are mounted on the detecting arch over the conveyor. These tags have a known serial number which is different from the numbers encoded in the vests so that these tags are not detected as safety tags. The RFID reader frequently reads these tags 17S and 17T (every second or so) to ensure each of its antennas 20A, 20B, 20C and 20D are still functioning. If one antenna fails to report one of these tags, the conveyor is stopped and the alarm is raised.

A computer is included in the control system 16A to frequently monitor the operational state of the RFID reader 16C to ensure that the system is functioning properly. The computer 16A frequently sends a request (every second or so) to the RFID reader 16C to get from the antennas 20A to 20D the serial numbers of the RFID tags together with the date and time. If after a maximum delay (say 0.5 second) the computer 16A has received no response or if the response is incorrect, it stops the conveyor and raises the alarm.

The RFID reader 16C also sends a request to the computer 16B frequently (every second or so) to get the date and time. If after a maximum delay (say 0.5 second) the reader has received no response or if the response is incorrect, it stops the conveyor and raises the alarm.

The testing station 16B displays on a monitor 16D the vest number of a vest under test in case more than one worker is present at the testing station during the test and that only one of the vests passes the test. The monitor can display many vests at the same time if many vests have been tested successfully at the same time. If a worker therefore sees that his vest number is not displayed, this provides an indication to the worker concerned that at least one of the RFID tags on his vest is not functional.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A safety conveyor apparatus comprising:
a conveyor having a conveyor belt or belts for transporting materials to a required location, the conveyor defining a feed section at which a worker loads the materials onto the conveyor and a conveyor section;
and an apparatus for selectively immobilizing the conveyor to ensure the safety of the worker in case the worker should be accidentally carried on the conveyor into the conveyor section, the apparatus comprising:
at least one RFID tag member arranged to be carried on an article of clothing to be worn by a worker;
a plurality of RFID antennas mounted on the conveyor at a position beyond the feed section;
wherein at least one of the plurality of the RFID antennas is arranged on a bar member located above the conveyor section at a position so that material on the conveyor section passes underneath said at least one of said plurality of RFID antennas with a front face of said at least one of said plurality of RFID antennas facing generally downwardly toward the conveyor;
and a control system responsive to detection of one or more of the tags by one or more of the antennas for stopping the movement of the conveyor.

2. The apparatus according to claim 1 wherein the RFID tag member includes a tag and a spacer adjacent the tag arranged such that when the RFID tag member is attached to the clothing the spacer acts to ensure a reading distance of the RFID tag member by the RFID antennas even when the article of clothing is pressed against the worker's body.

3. The apparatus according to claim 2 wherein the spacer is formed of closed cell foam.

4. The apparatus according to claim 1 wherein the RFID antennas are mounted on the conveyor section so as to be oriented in such a way to reduce reflections that could falsely detect the RFID tag member when the worker is located at the feed section.

5. The apparatus according to claim 4 wherein the RFID antennas each include a radio frequencies shield formed of a metal layer combined with an electromagnetic field absorbing material to prevent emission of electromagnetic waves by the RFID antennas in a direction away from the material on the conveyor.

6. The apparatus according to claim 1 wherein two RFID antennas are located on said bar member above the conveyor section and spaced transversely of the conveyor section.

7. The apparatus according to claim 1 wherein the conveyor section has upstanding side walls each on a respective side wherein the RFID antennas include additional RFID antennas mounted on the side walls and facing inwardly therefrom.

8. The apparatus according to claim 1 wherein the RFID tag members are programmed with a predetermined pattern allowing the control system to quickly and efficiently differentiate tags on the article of clothing from any other RFID tags that can be present on the conveyor section.

9. The apparatus according to claim 8 wherein there is provided a plurality of RFID tag members each arranged to be applied to articles of clothing to be worn by different workers and wherein all RFID tag members are encoded with the same simple easily detectable code.

10. The apparatus according to claim 8 wherein each of the RFID tag members is encoded with a separate additional code unique to the tag.

11. The apparatus according to claim 1 wherein the control system includes a test unit arranged to detect all of the RFID tag members in a test procedure to confirm that all are operating.

12. The apparatus according to claim 11 wherein there is provided a plurality of articles of clothing arranged to be worn by different workers and wherein each article has the RFID tag members thereof encoded with a separate additional code unique to the article in order to confirm that all of the RFID tag members detected in the set up procedure relate to the same article.

13. The apparatus according to claim 12 wherein each of the RFID tag members is programmed with the article of clothing sequence number, the quantity of RFID tag members there are on the article of clothing and the individual tag number.

14. The apparatus according to claim 13 wherein the test unit is arranged to display on a monitor the article of clothing sequence number in case more than one worker is present during the test procedure and that only one of the articles of clothing pass the test procedure.

15. A safety conveyor apparatus comprising:
a conveyor having a conveyor belt or belts for transporting materials to a required location, the conveyor defining a feed section at which a worker loads the materials onto the conveyor and a conveyor section;
and an apparatus for selectively immobilizing the conveyor to ensure the safety of the worker in case the worker should be accidentally carried on the conveyor into the conveyor section, the apparatus comprising:
at least one RFID tag member arranged to be carried on an article of clothing to be worn by a worker;

a plurality of RFID antennas mounted on the conveyor at a position beyond the feed section;
and a control system responsive to detection of one or more of the tags by one or more of the antennas for stopping the movement of the conveyor;
wherein at least one test RFID tag member is mounted on the conveyor section which has a known serial number different from serial numbers encoded in the RFID tag members arranged to be mounted on the articles of clothing and wherein the control system is arranged to obtain a reading of said at least one test RFID tag member periodically for stopping the conveyor in the event that no reading is obtained.

* * * * *